United States Patent
Yamauchi et al.

(10) Patent No.: US 6,907,616 B2
(45) Date of Patent: Jun. 14, 2005

(54) TRANSFER RATE CONTROLLER, DECODING SYSTEM, MEDIUM, AND INFORMATION AGGREGATE

(75) Inventors: Kenichiro Yamauchi, Nagaokakyo (JP); Junichi Komeno, Osaka (JP); Yoshitaka Yaguchi, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 663 days.

(21) Appl. No.: 09/824,280

(22) Filed: Apr. 2, 2001

(65) Prior Publication Data

US 2001/0038644 A1 Nov. 8, 2001

(30) Foreign Application Priority Data

Mar. 31, 2000 (JP) ........................................ 2000-096511

(51) Int. Cl.[7] .............................................. H04N 7/173
(52) U.S. Cl. ........................ 725/96; 725/116; 725/146; 386/80
(58) Field of Search .............................. 725/86, 87, 88, 725/89, 90, 91, 94, 96, 98, 116, 120, 134, 146, 110; 386/46, 80, 109, 110, 124

(56) References Cited

U.S. PATENT DOCUMENTS

| | | | |
|---|---|---|---|
| 5,534,944 A | 7/1996 | Egawa et al. ............... 348/584 |
| 5,566,174 A | 10/1996 | Sato et al. .................. 370/468 |
| 5,652,627 A | * 7/1997 | Allen ......................... 725/100 |
| 5,694,332 A | 12/1997 | Maturi ........................ 700/94 |
| 5,721,815 A | * 2/1998 | Ottesen et al. .............. 725/100 |
| 5,754,241 A | 5/1998 | Okada et al. ............... 375/240 |
| 5,771,335 A | * 6/1998 | Lee ............................. 386/111 |
| 5,881,245 A | 3/1999 | Thompson .................. 709/219 |
| 6,061,399 A | 5/2000 | Lyons et al. ................ 375/240 |
| 6,118,786 A | 9/2000 | Tiernan et al. ............. 370/416 |
| 6,137,539 A | * 10/2000 | Lownes et al. ............. 725/139 |
| 6,452,943 B1 | * 9/2002 | Furuya ........................ 725/94 |
| 6,584,275 B1 | * 6/2003 | Blatter ........................ 386/94 |

FOREIGN PATENT DOCUMENTS

JP        10-285196        10/1998

OTHER PUBLICATIONS

Japanese Office Action dated Sep. 9, 2003.

* cited by examiner

Primary Examiner—Andrew Faile
Assistant Examiner—James A. Fletcher
(74) Attorney, Agent, or Firm—RatnerPrestia

(57) ABSTRACT

A transfer rate controller, has
  input means of inputting a picture or sound stream;
  packet rate adjusting means of controlling a transfer rate of the stream by adjusting an interval between packets respectively belonging to each frames of the inputted stream; and
  output means of outputting the stream outputted from the packet rate adjusting means.

15 Claims, 4 Drawing Sheets

TRANSFER RATE CONTROLLER, DECODING SYSTEM, MEDIUM, AND INFORMATION AGGREGATE

BACKGROUND OF THE INVENTION

1. Field of the Invention

The present invention relates to a transfer rate controller for controlling a transfer rate when AV data is transferred, a decoding system, a medium, an information aggregate, a recording medium, and a transmitting medium.

2. Related Art of the Invention

In case of performing special reproduction such as cue and review on MPEG image data, only I pictures (intra-coded image) are normally extracted from the MPEG image data, and the extracted I pictures are used as special reproduction data.

The MPEG image data includes P pictures (Predictive coded image), B pictures (Bidirectionally predictive coded image) and so on as well as I pictures.

However, special reproduction data only includes I pictures other than P pictures and B pictures. Further, I pictures are larger in image size than B pictures and P pictures. Therefore, upon reproducing special reproduction image, a larger amount of bits are transferred to a decoder than normal reproduction.

For this reason, a transfer amount to a temporary buffer increases. The temporary buffer temporarily accumulates special reproduction image transmitted to the decoder. Hence, control is necessary for preventing an overflow in the temporary buffer.

FIG. 3 shows a conventional reproducing device 25 that exercise control to prevent an overflow in the temporary buffer during special reproduction.

A reproducing device 25 is configured by a recording means 5, a reproducing means 18, an image data reading means 19, a reading control means 20, a temporary buffer 21, an I/O monitor means 22, a buffer control means 23, and a decoder 11. Moreover, a monitor 4 is connected to the reproducing device 25.

The recording means 5 is a means of recording AV data in MPEG transport stream format. For example, it is possible to use a recording device such as a hard disk being capable of random access and a recording device such as a VCR being capable of sequential access. Hereinafter, the device such as a hard disk being capable of random access will be discussed as a recording means.

The reproducing means 18 is a means of reproducing AV data recorded in the recording means 5. In the case of normal reproduction, the reproducing means 18 outputs reproduced AV data as a PES (Packetized Elementary Stream) in response to request from the image data reading means 19. Also, upon special reproduction, the reproducing means 18 extracts I pictures used for special reproduction from the reproduced AV data, generates special reproduction data, and outputs the data as a PES in response to request from the image data reading means 19.

The image data reading means 19 is a means of reading a PES from the reproducing means 18 according to the control exercised by the reading control means 20, and of outputting the read PES packets as a PES 26 to the temporary buffer 21.

The reading control means 20 is a means of controlling an amount of the PES 26 outputted from the image data reading means 19, based on a state of the input and output of the temporary buffer 21 that is notified of by the I/O monitor means 22.

The temporary buffer 21 is a means of temporarily storing the PES 26 outputted from the image data reading means 19 and of outputting the stored PES 26 to the decoder 11.

The I/O monitor means 22 is a means of monitoring input and output amounts of the temporary buffer 21 and of notifying the reading control means 20 and the buffer control means 23 of the state of the input and output of the temporary buffer 21.

The buffer control means 23 is a means of adjusting an output amount of the temporary buffer 21.

The decoder 11 is a means of decoding a PES transmitted from the temporary buffer 21 and of converting the PES to an analog signal.

The monitor 4 is a means of inputting an analog signal from the decoder 11 and of displaying an image on the monitor 4.

The following will discuss the operation for special reproduction in the conventional reproducing device 25.

The reproducing means 18 reads AV data recorded in MPEG transport stream format in the recording means 5, extracts I pictures used for special reproduction, and converts the extracted I pictures to a PES.

The image data reading means 19 reads the PES according to control exercised by the reading control means 20 and outputs the PES to the temporary buffer 21 as the PES 26.

The temporary buffer 21 temporarily stores the PES 26. And then, the temporary buffer 21 outputs the stored PES for each picture to the encoder 11 according to the control of the buffer control means 23.

The encoder 11 inputs the PES for each picture, decodes the PES, and makes a conversion to an analog signal.

The monitor 4 inputs an analog signal and displays a picture.

Meanwhile, the I/O monitor means 22 monitors an amount of data inputted to the temporary buffer 21 and an amount of data outputted from the temporary buffer 21 to the decoder 11.

And then, the reading control means 20 and the buffer control means 23 is notified of a state of the input and output of the temporary buffer 21.

The reading control means 20 always monitors information from the buffer monitor means 22 and exercises control such that the image data reading means 19 reads data for special reproduction in PES format when the temporary buffer 21 outputs data to the decoder 11. Subsequently, the image data reading means 19 stores the read data in the temporary buffer 21.

Further, the buffer control means 23 always monitors information from the buffer monitor means 22 and exercises control such that data of one picture is outputted to the decoder 11 when data of one picture is stored in the temporary buffer 21.

As described above, the reading control means 20 and the buffer control means 23 control the input and output of a PES of the temporary buffer 21, according to the state of the input and output of the temporary buffer 21 that is transmitted from the I/O monitor means 22.

Therefore, the data input to the temporary buffer 21 and the data output from the temporary buffer 21 are controlled in synchronization with each other, thereby preventing an overflow in the temporary buffer 21.

Incidentally, the following will discuss a system in which functions for reproducing AV data and decoding the reproduced AV data are separately realized by different devices and the AV data reproduced in the reproducing device is transferred to a decoding system as an MPEG transport stream.

FIG. 4 shows such a system.

A reproducing device 27 is a device for reproducing AV data and outputting it as an MPEG transport stream. Moreover, a decoding system 28 is a device for decoding the AV data transmitted as an MPEG transport stream and displaying its picture on the monitor 4.

For example, an IEEE 1394 bus connects the reproducing device 27 and a decoding system 28.

The reproducing device 27 is configured by a recording means 5, a reproducing means 6, an image data reading means 7, and a reading control means 20.

Further, the decoding system 28 is configured by a converting means 29, a temporary buffer 9, a decoder 11, an I/O monitor means 22, and a buffer control means 23.

The reading means 5 and the reading control means 20 constituting the reproducing device 27 are identical to those of FIG. 3.

Additionally, unlike the reproducing means 18 of FIG. 3, the reproducing means 6 is a means of outputting generated special reproduction data as an MPEG transport stream.

Unlike the image data reading means 19 of FIG. 3, the image data reading means 7 is a means of reading an MPEG transport stream and outputting it as an MPEG-TS (MPEG transport stream) 12.

The I/O monitor means 22, the buffer control means 23, a temporary buffer 9, and the decoder 11 constituting the decoding system 28 are identical to those of FIG. 3.

Additionally, the converting means 29 is a means of inputting a transmitted MPEG transport stream, making a conversion to a PES, and outputting the PES.

The following will discuss the operation for special reproduction in the reproducing device 27 and the decoding system 28 as configured above.

The reproducing means 6 reads AV data recorded in MPEG transport stream format in the recording means 5 and extracts I pictures used for special reproduction. And then, the reproducing means 6 outputs the extracted I pictures as an MPEG transport stream.

The image data reading means 7 reads the MPEG transport stream and outputs it to the converting means 29 as the MPEG-TS12 via an IEEE 1394 bus.

The converting means 29 converts the MPEG-TS12 transmitted from the reproducing device 27 to a PES and outputs it to the temporary buffer 9.

The temporary buffer 9 temporarily stores the PES. And then, the temporary buffer 9 outputs the stored PES for each picture to the decoder 11 according to the control of the buffer control means 23.

The decoder 11 input the PES for each picture, decodes it, and makes a conversion to an analog signal.

The monitor 4 inputs the analog signal and displays a picture.

Meanwhile, the I/O monitor means 22 monitors an amount of data inputted in PES format to the temporary buffer 9 and an amount of data outputted in PES format from the temporary buffer 9 to the decoder 11.

Meanwhile, the I/O monitor means 22 notifies the buffer control means 23 of the state of the input and output of the temporary buffer 21.

However, the reproducing device 27 and the decoding system 28 are connected with each other via an IEEE 1394 bus and so on. Hence, unlike the configuration of FIG. 3, the I/O monitor means 22 cannot notify the reading control means 20 of detailed information such as a state of the input and output of the buffer 21 without delay.

Moreover, the image reading means 7 outputs AV data in MPEG transport stream format, so that an amount of the output cannot be changed freely.

Therefore, in the configuration of FIG. 4, upon special reproduction, it is not possible to synchronize an input amount and an output amount of the temporary buffer 9, so that an overflow may occur in the temporary buffer 9.

As described above, when the devices are configured separately for reading AV data and decoding the read AV data, it is difficult for the reading device to know the state of the buffer. The buffer temporarily stores data transmitted to the decoder.

Also, even if the state of the buffer is known to the reading device, when AV data is transferred as an MPEG transport stream from the reading device to the decoding system, an amount of transfer cannot be adjusted freely. For this reason, an overflow may occur in the buffer.

Namely, in the case where the devices are configured separately for reading AV data and decoding the read AV data, the buffer for temporarily storing data transmitted to the decoder may have an overflow during special reproduction.

SUMMARY OF THE INVENTION

In view of the above problem, the object of the present invention is to provide a transfer rate controller, a decoding system, a medium, an information aggregate, a recording medium, and a transfer medium that can prevent an overflow in the buffer during special reproduction, in the case where the devices are separately configured for reading AV data and decoding the read AV data. The buffer temporarily stores data transmitted to the decoder.

One aspect of the present invention is a transfer rate controller, comprising:

input means of inputting a picture or sound stream;

packet rate adjusting means of controlling a transfer rate of the stream by adjusting an interval between packets respectively belonging to each frames of the inputted stream; and output means of outputting the stream outputted from the packet rate adjusting means.

Another aspect of the present invention is the transfer rate controller, the packet rate adjusting means changes the frame rate.

Still another aspect of the present invention is the transfer rate controller, the packet rate adjusting means makes no change in the frame rate.

Yet another aspect of the present invention is the transfer rate controller, wherein the stream has a plurality of multiplexed data.

Still yet another aspect of the present invention is the transfer rate controller, wherein the stream has no multiplexed data.

A further aspect of the present invention is the transfer rate controller, wherein the stream is an MPEG transport stream and the packet is a transport packet.

A still further aspect of the present invention is the transfer rate controller, wherein the packet rate adjusting means controls a transfer rate according to a warning indicative that an overflow is likely to occur in a buffer of a decoder.

A yet further aspect of the present invention is a decoding system, comprising:

a buffer for temporarily storing an inputted stream; and decoding means of inputting the stream from the buffer and decoding and outputting the stream, monitor means of monitoring a free space of the buffer and issueing a warning to the transfer rate controller, which transmits the stream, if an overflow is likely to occur in the buffer.

A still yet further aspect of the present invention is a medium for storing a program and/or data for allowing a computer to carry out all or some functions of all or some means of the transfer rate controller or the decoding system, wherein the medium is, processible by a computer.

An additional aspect of the present invention is an information aggregate comprising a program and/or data for allowing a computer to carry out all or some functions of all or some means of the transfer rate controller or the decoding system.

A yet additional aspect of the present invention is a transmitting medium for transmitting an MPEG transport stream outputted from the transfer rate controller.

A still yet additional aspect of the present invention is a recording medium for recording an MPEG transport stream outputted from the transfer rate controller.

BRIEF DESCRIPTION OF THE DRAWINGS

FIG. 1 is a block diagram showing a configuration of a system including a transfer rate controller according to Embodiment 1 of the present invention.

FIG. 2 is an explanatory drawing showing control on a transfer rate by the transfer rate controller according to Embodiment 1 of the present invention.

FIG. 3 is a block diagram showing a configuration of a conventional reproducing device.

FIG. 4 is a block diagram showing that the reproducing device and a decoding system are provided separately.

DESCRIPTION OF SYMBOLS

Figure 1:
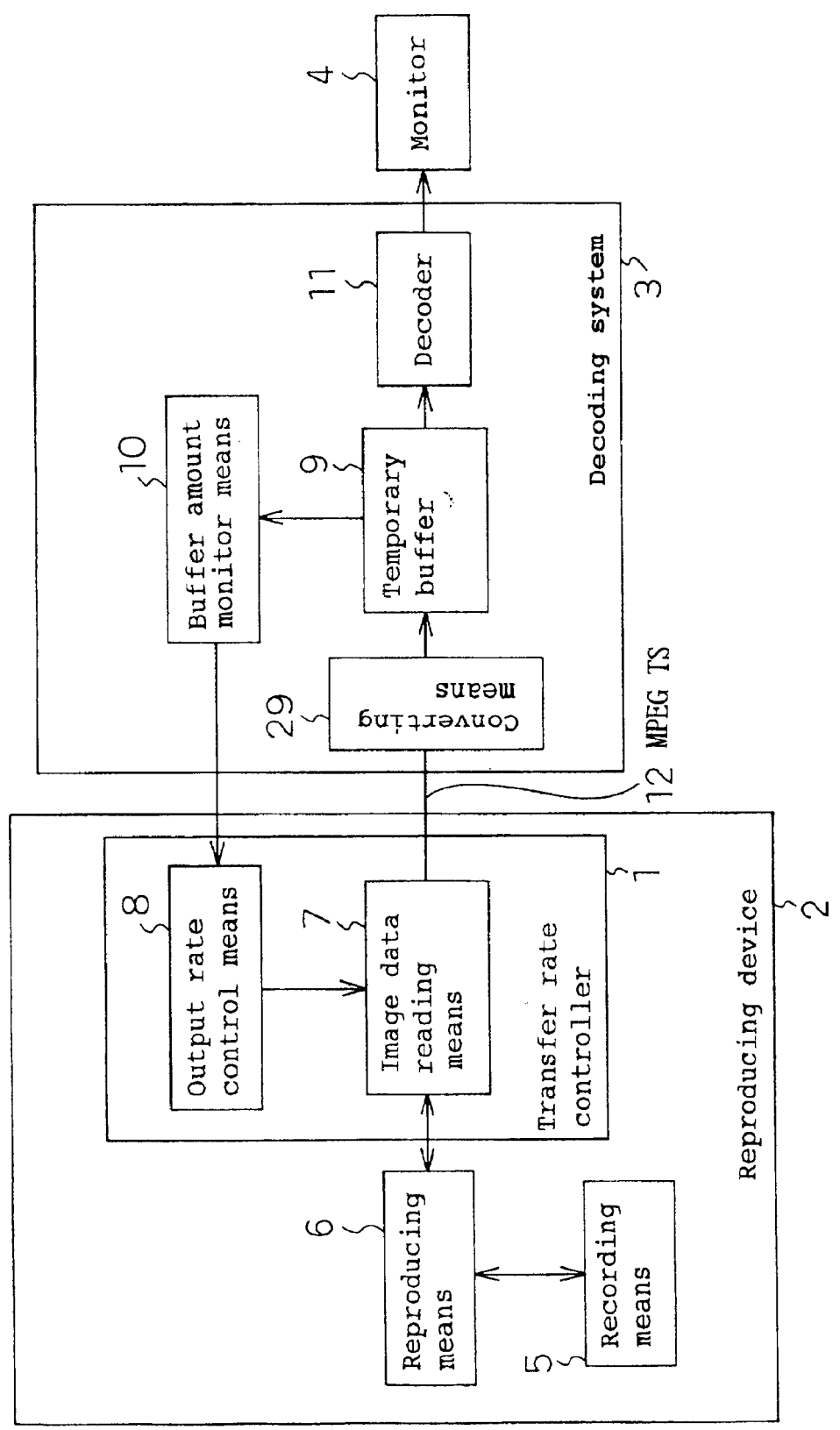
[FIG. 1]

1 Transfer rate controller
2 Reproducing device
3 Decoding system
4 Monitor
5 Recording means
6 Reproducing means
7 Image data reading means
8 Output rate control means
9 Temporary buffer
10 Buffer amount monitor means
11 Decoder
12 MPEG-TS
13 Frame interval
14 Packet transfer time
15 Packet transfer time
16 Overflow warning signal 16
17 Transport packet

PREFERRED EMBODIMENTS OF THE INVENTION

Referring to the drawings, the following will describe an embodiment of the present invention.

(Embodiment 1)

FIG. 1 shows the configuration of a system including a transfer rate controller 1 and a decoding system 3 of this embodiment. The transfer rate controller 1 is included in a reproducing device 2.

Further, the reproducing device 2 and the decoding system 3 are connected with each other via an IEEE 1394 bus and so on, and a monitor 4 is connected to the decoding system 3.

The reproducing device 2 is a device for reproducing AV data and outputting it as an MPEG transport stream. Further, the decoding system 3 is a device for decoding AV data transmitted as an MPEG transport stream and displaying its picture on the monitor 4. Furthermore, the transfer rate controller 1 is a device for controlling a transfer rate of an MPEG transport stream for special reproduction.

The reproducing device 2 is configured by a recording means 5, are producing means 6, and the transfer rate controller 1.

Also, the transfer rate controller 1 is configured by an image data reading means 7 and an output rate control means 8.

Moreover, the decoding system 3 is configured by a converting means 29, a temporary buffer 9, a decoder 11, and a buffer amount monitor means 10.

The recording means 5 is a means such as a hard disk for recording AV data in MPEG transport stream format.

The reproducing means 6 is a means of reproducing AV data recorded in the recording means 5. In case of normal reproduction, the reproducing means 6 reads reproduced AV data in response to a request from the image data reading means 7 and outputs the data as an MPEG transport stream. Moreover, upon special reproduction, the reproducing means 6 extracts I pictures used for special reproduction from the reproduced AV data, generates special reproduction data, and outputs an MPEG transport stream for special reproduction in response to a request from the image data reading means 7.

The image data reading means 7 constituting the transfer rate controller 1 is a means of reading an MPEG transport stream from the reproducing means 6 according to the control of the output rate control means 8 and of outputting the MPEG transport stream to the IEEE 1394 bus.

The output rate control means 8 is a means of controlling a transfer rate for outputting an MPEG transport stream as an MPEG-TS12 from the image data reading means 7, according to a warning issued by the buffer amount monitor means 10.

Additionally, the converting means 29 is a means of converting the MPEG-TS12 to a PES. The MPEG-TS12 is an MPEG transport stream transmitted from the reproducing device 2.

The temporary buffer 9 is a means of temporarily storing the PES transmitted from the converting means 29 and of outputting the PES to the decoder 11.

The buffer a mount monitor means 10 is a means of monitoring a free space of the temporary buffer 9 and of issuing a warning to the output rate control means 8 in the case where the free space decreases.

The decoder 11 is a means of decoding the PES transmitted from the temporary buffer 9 and of converting it to an analog signal.

The monitor 4 is a means of inputting the analog signal from the decoder 11 and of displaying a picture.

Additionally, the output rate control means 8 of this embodiment is an example of a packet rate adjusting means of the present invention. The image data reading means 7 of this embodiment is an example of an input means of the present invention. The image data reading means 7 of this embodiment also acts as an output means of the present invention. Also, the temporary buffer 9 of this embodiment is an example of a buffer of the present invention. The decoder 11 of this embodiment is an example of a decoding means of the present invention. The buffer amount monitor means 10 is an example of a monitor means of the present invention. Further, an overflow warning signal of this embodiment is an example of a warning of the present invention.

The following will discuss the operation of this embodiment.

The operation for special reproduction on AV data will be described. The AV data is recorded in MPEG transport stream format in the reading means 5.

The reproducing means 6 reads AV data recorded in MPEG transport stream format in the recording means 5 and extracts I pictures used for special reproduction. And then, the reproducing means 6 generates an MPEG transport stream for special reproduction from the extracted I pictures.

The image data reading means 7 reads the MPEG transport stream according to the control of the output rate control means 8 and transfers it to an IEEE 1394 bus as an MPEG-TS12, which is an MPEG transport stream.

Meanwhile, the converting means 29 of the decoding system 3 inputs the MPEG-TS12 transmitted from the reproducing device 2, converts it to a PES, and transfers it to the temporary buffer 9.

The temporary buffer 9 temporarily stores the PES from the converting means 29.

The decoder 11 inputs the PES for each picture from the temporary buffer 9, decodes the PES, and makes a conversion to an analog signal.

The monitor 4 inputs the analog signal and displays a picture.

Meanwhile, the buffer amount monitor means 10 monitors a free space of the temporary buffer 9.

And then, in the case where the temporary buffer 9 has a small free space, the buffer amount monitor means 10 issues an overflow warning signal to the output rate control means 8 before an overflow occurs in the temporary buffer 9.

When the overflow warning signal is received by the output rate control means 8 from the buffer amount monitor means 10, the output rate control means 8 widens an interval between outputted transport packets at a timing of receiving the warning.

Figure 2:
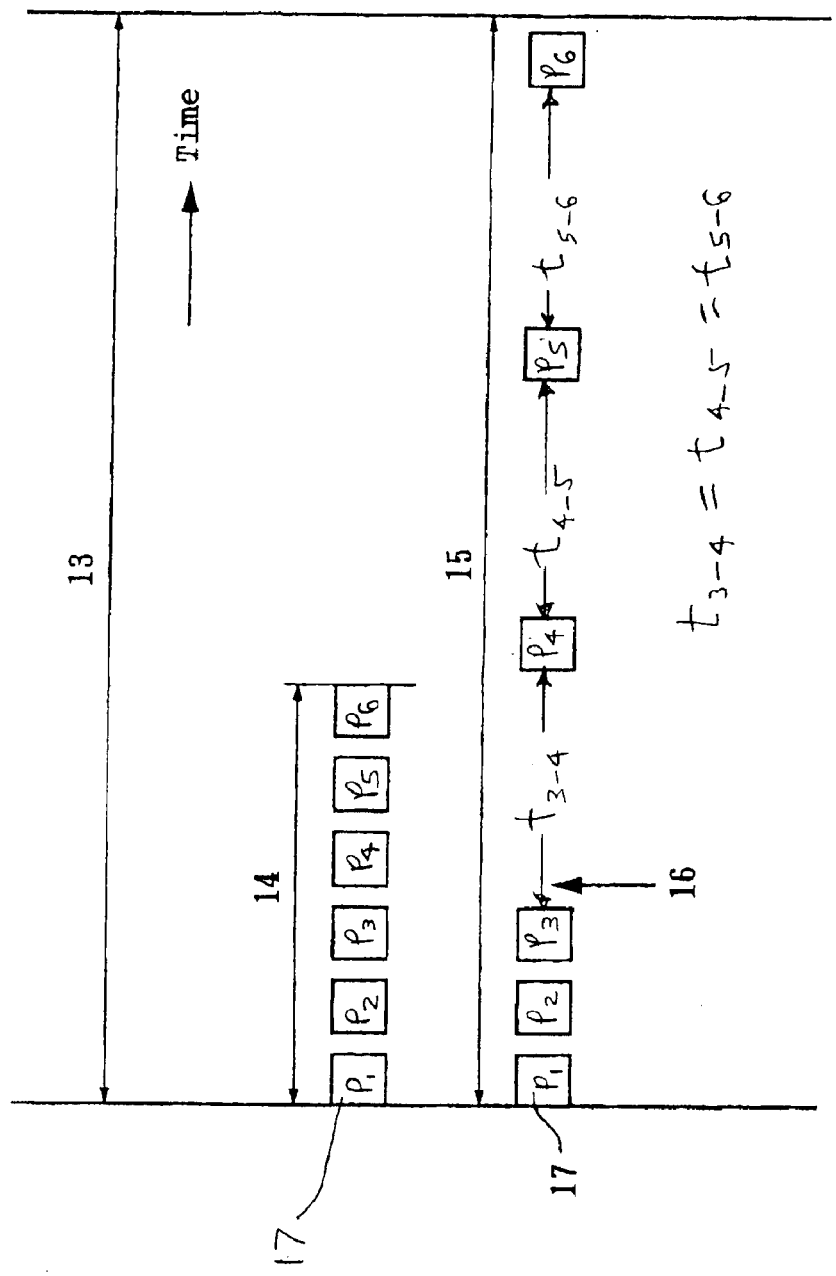
[FIG. 2]
Figure 3:
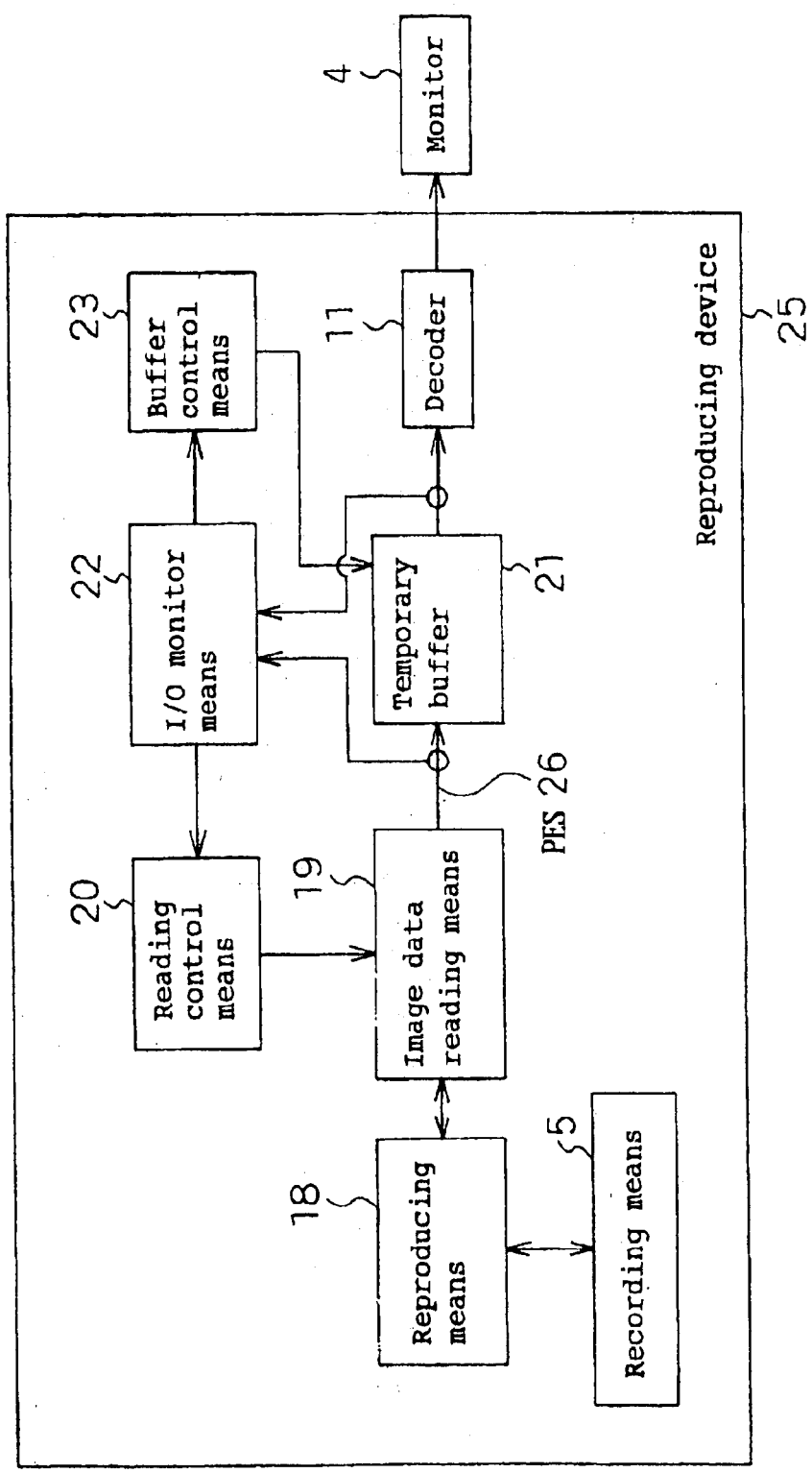
[FIG. 3]
Figure 4:
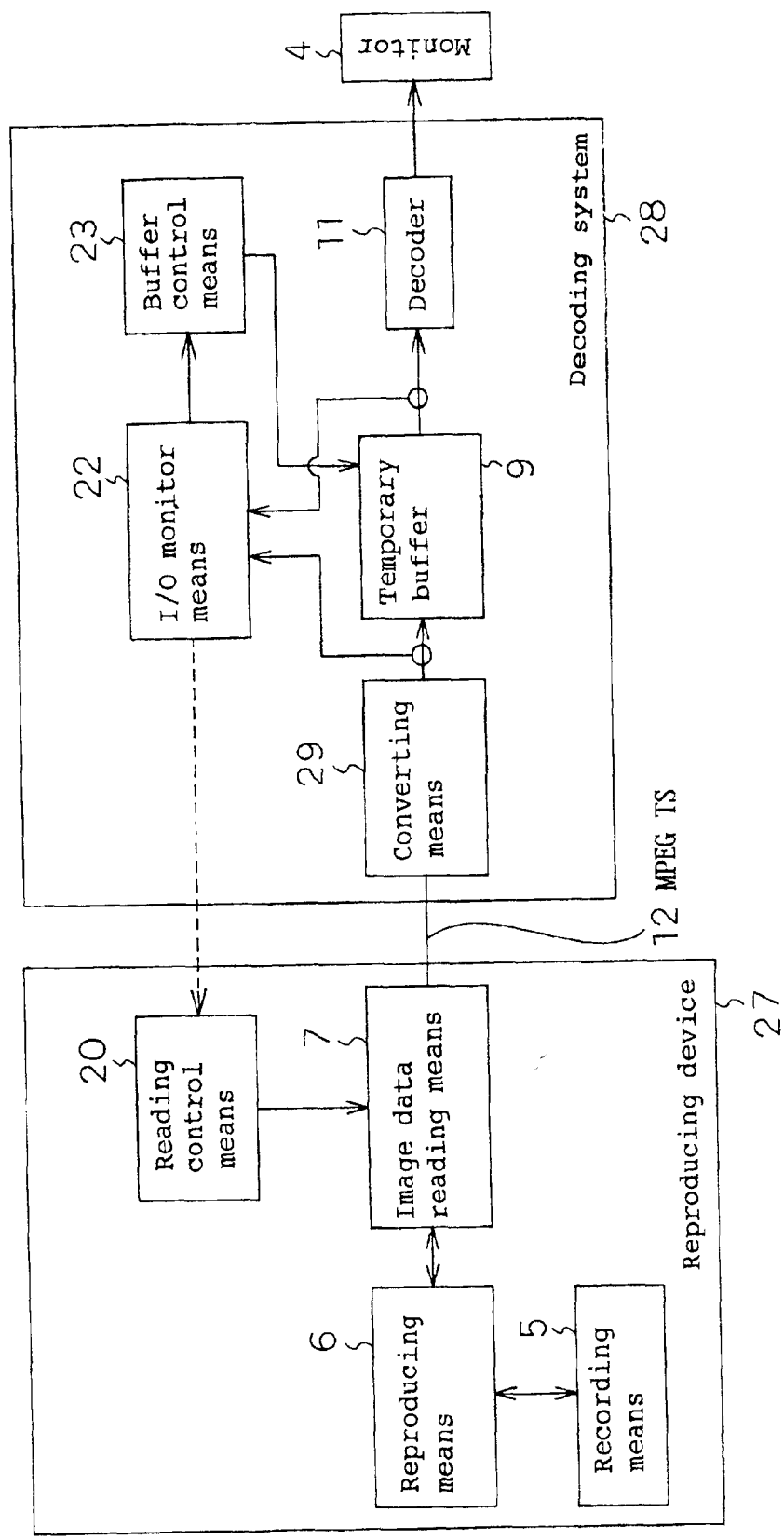
[FIG. 4]

FIG. 2 is a time chart showing how an interval is widened between the outputted transport packets in the case where the output rate control means 8 receives an overflow warning signal 16.

In FIG. 2, time elapses from the left to the right, from the past to the future.

The overflow warning signal 16 is a signal for an overflow warning that is transmitted from the buffer amount monitor means 10, which is a signal and for notifying that the free space of the temporary buffer 9 is small.

A frame interval 13 is a time interval between the start of outputting a picture and the start of outputting the subsequent picture.

A packet transfer time 14 is time required for outputting packets constituting a picture in the case where the overflow warning signal 16 is not transmitted from the buffer amount monitor means 10.

A packet transfer time 15 is time required for outputting packets constituting a picture in the case where the overflow warning signal 16 is transmitted from the buffer amount monitor means 10.

Transport packets 17 consist of packets P1–P6 which compose one picture.

The output rate control means 8 widens a time interval for outputting transport packets 17 as indicated by the packet transfer time 15 at a timing of receiving the overflow warning signal 16.

Namely, as indicated by the following equation 1, the output rate control means 8 sets a time interval for outputting transport packets after receiving the overflow warning signal 16.

$$\text{output interval} = \frac{\text{remaining time to the start of next picture}}{\text{number of packets not being transferred}} \quad \text{[Equation 1]}$$

In the case shown in FIG. 2, as a result of receiving overflow warning signal 16, each output interval between P3–P4, P4–P5, and P5–P6 becomes equal. As shown, Interval 14 is the packet transfer time under normal condition, and interval 15 is the packet transfer time under overflow warning condition.

Therefore, the output rate control means 8 takes a longer time to output the same number of packets by receiving the overflow warning signal 16, thereby reducing a transfer rate of the PES inputted by the temporary buffer 9. Hence, an overflow is less likely to occur in the temporary buffer 9.

Further, in the case where the free space of the temporary buffer 9 is rapidly reduced, the buffer amount monitor means 10 changes a value of the overflow warning signal 16 and makes a notification to the output rate control means 8.

In case of indicating an urgent overflow warning signal, the output rate control means 8 thins out pictures to be outputted from an MPEG transport stream for special reproduction. Namely, to the decoding system 3, the image data reading means 7 does not output transport packets constituting a thinned out picture. An interval of thinning out pictures is determined by a degree of emergency that is indicated by the overflow warning signal 16.

Moreover, the overflow warning signal 16 from the buffer amount monitor means 10 is quite smaller in frequency of issues than in the input and output state of the temporary buffer 9, that is described in the conventional art. Therefore, it is possible to sufficiently transfer an overflow warning signal between different devices.

As described above, according to this embodiment, even when the reproducing device 2 and the decoding system 3 are different devices and special reproduction data is transferred as an MPEG transport stream from the reproducing device 2 to the decoding system 3, an overflow is less likely to occur in the temporary buffer 9.

Additionally, in this embodiment, in the case where the overflow warning signal 16 is transmitted, an interval between transport packets is widened and pictures to be outputted are thinned out according to a degree of emergency of the signal. The arrangement is not limited. According to a degree of emergency of the overflow warning signal 16, pictures to be outputted may be thinned out and an interval may be widened between transport packets constituting pictures not being thinned out. Further, instead of thinning out pictures, a time interval of the pictures may be increased without thinning out the pictures. Furthermore, in case of increasing a time interval of pictures, a time interval may be increased or does not have to be increased between transport packets constituting the pictures.

Also, in this embodiment, the recording means 5 is described as a hard disk. However, the recording means is not limited, so that it is possible to adopt a magneto-optical disk, a device for making a recording in a tape medium such as a VCR, and so on. However, in the case of a VCR, unlike a hard disk, special reproduction data is generated when AV data is recorded, and the generated special reproduction data is stored in a region for storing special reproduction data. The region is provided on a tape medium. Therefore, in this case, the reproducing means 6 does not have to generate special reproduction data upon special reproduction. In short, it is only necessary to provide a recording device being capable of random access or a recording device being capable of sequential access.

Moreover, in this embodiment, the transfer rate controller 1 is included in the reproducing device 2. The arrangement is not limited. As the transfer rate controller 1, it is also possible to adopt a device for reading special reproduction data transmitted from a transmitting medium such as a network and for controlling and outputting a transfer rate as earlier mentioned.

Further, regarding all or some of the means of the transfer rate controller 1 and the decoding system 3 of this embodiment, all or some of the functions may be carried out like software or by hardware.

Additionally, a medium described below also belongs to the present invention: the medium has programs and/or data for allowing a computer to carry out all or some of the functions regarding all or some of the means of the transfer rate controller or the decoding system of the present invention, and the medium can be processed by a computer.

Moreover, an information aggregate described below also belongs to the present invention: the information aggregate is programs and/or data for allowing a computer to carry out all or some of the functions regarding all or some of the means of the transfer rate controller or the decoding system of the present invention.

Furthermore, the data of the present invention includes a data structure, a data format, a data type, and so on. Also, the medium of the present invention includes a recording medium such as ROM, a transmitting medium such as Internet, and a transmitting medium such as light, a radio wave, and a sound wave. Additionally, the medium belonging to the present invention includes a recording medium for recording programs and/or data and a transmitting medium for transmitting programs and/or data. Moreover, processability by a computer refers to readability by a computer in the case of a recording medium such as ROM. In the case of a transmitting medium, the processability means that programs and/or data to be transmitted can be processed by a computer as a result of transmission.

Further, a program recording medium records programs and/or data for allowing a computer to carry out all or some of the functions regarding all or some of the means of the transfer rate controller 1 or the decoding system 3 of this embodiment. The program recording medium is readable by a computer and may allow the read programs and/or data to carry out the above functions by cooperating with the computer.

Also, the information aggregate of the present invention includes software such as programs and/or data.

Moreover, a transmitting medium, which transmits an MPEG transport stream outputted from a special reproduction data generating device of the present invention, also belongs to the present invention.

Also, a recording medium, which records an MPEG transport stream outputted from the special reproduction data generating device of the present invention, also belongs to the present invention.

As earlier mentioned, in the case where devices for reading AV data and decoding the read AV data are provided separately, it is possible to provide a transfer rate controller, a decoding system, a medium, an information aggregate, a recording medium, and a transmitting medium, that does not cause an overflow in a buffer for temporarily storing data to the decoder upon special reproduction.

What is claimed is:

1. A transfer rate controller, comprising:
   input means of inputting a picture or sound stream;
   packet rate adjusting means of controlling a transfer rate of the stream by adjusting an interval between packets respectively belonging to each frame of the inputted stream; and
   output means of outputting the stream outputted from the packet rate adjusting means;
   wherein the interval between packets adjusted by the packet rate adjusting means is a value of remaining time to the start of next frame divided by number of packets not being transferred.

2. The transfer rate controller according to claim 1, the packet rate adjusting means changes the frame rate.

3. The transfer rate controller according to claim 1, the packet rate adjusting means makes no change in the frame rate.

4. The transfer rate controller according to any one of claims 1 to 3, wherein the stream has a plurality of multiplexed data.

5. The transfer rate controller according to any one of claims 1 to 3, wherein the stream has no multiplexed data.

6. The transfer rate controller according to any one of claims 1 to 3, wherein the stream is an MPEG transport stream and the packet is a transport packet.

7. The transfer rate controller according to any one of claims 1 to 3, wherein the packet rate adjusting means controls a transfer rate according to a warning indicative that an overflow is likely to occur in a buffer of a decoder.

8. A transfer system, comprising:
   the transfer rate controller according to claim 7; and
   a decoding system, having: a buffer for temporarily storing an inputted stream; and
   decoding means of inputting the stream from the buffer and decoding and outputting the stream,
   monitor means of monitoring a free space of the buffer and issuing a warning to the transfer rate controller, which transmits the stream, if an overflow is likely to occur in the buffer.

9. A method of transferring a data stream from a reproducing device to a decoder comprising the steps of:
   (a) transmitting over a transmission medium, to the decoder from the reproducing device, the data stream;
   (b) receiving over the transmission medium, from the reproducing device, the data stream at a predetermined data transfer rate;
   (c) storing the received data stream in a temporary buffer;
   (d) monitoring, within the decoder, a data overflow condition in the buffer;
   (e) transmitting, from the decoder to the reproducing device, a warning signal indicating the data overflow condition; and (f) adjusting, within the reproducing device, the data transfer rate of the data stream from the reproducing device to the decoder, by adjusting an interval between packets respectively belonging to each frame, whereby the decoder receives the data stream at a reduced data transfer rate to prevent buffer overflow, and the adjusted interval between packets is a value of remaining time to the start of next frame divided by number of packets not being transferred.

10. The method of claim 9 in which transmitting and receiving the data stream in steps (a) and (b), respectively, includes transmitting and receiving an MPEG transport stream.

11. The method of claim 9 in which step (b) of receiving and step (e) of transmitting includes, respectively, receiving the data stream and transmitting the warning signal between the reproducing device, which is housed in one unit and the decoder, which is housed in a separate unit.

12. The method of claim 9 in which step (b) of receiving includes receiving MPEG transport packets and step (f) of adjusting includes adjusting an interval between each transport packet.

13. The method of claim 9 in which transmitting and receiving the data stream in steps (a) and (b), respectively, includes transmitting and receiving the data stream over an IEEE 1394 bus.

14. The method of claim 9 in which step (b) of receiving includes receiving MPEG transport packets and step (c) of storing includes converting the received MPEG transport packets into a packetized elementary stream (PES).

15. A medium storing program instructions allowing a computer to carry out the method of any of claims 9 to 14, wherein the medium is processible by a computer.

* * * * *